Figure 1:
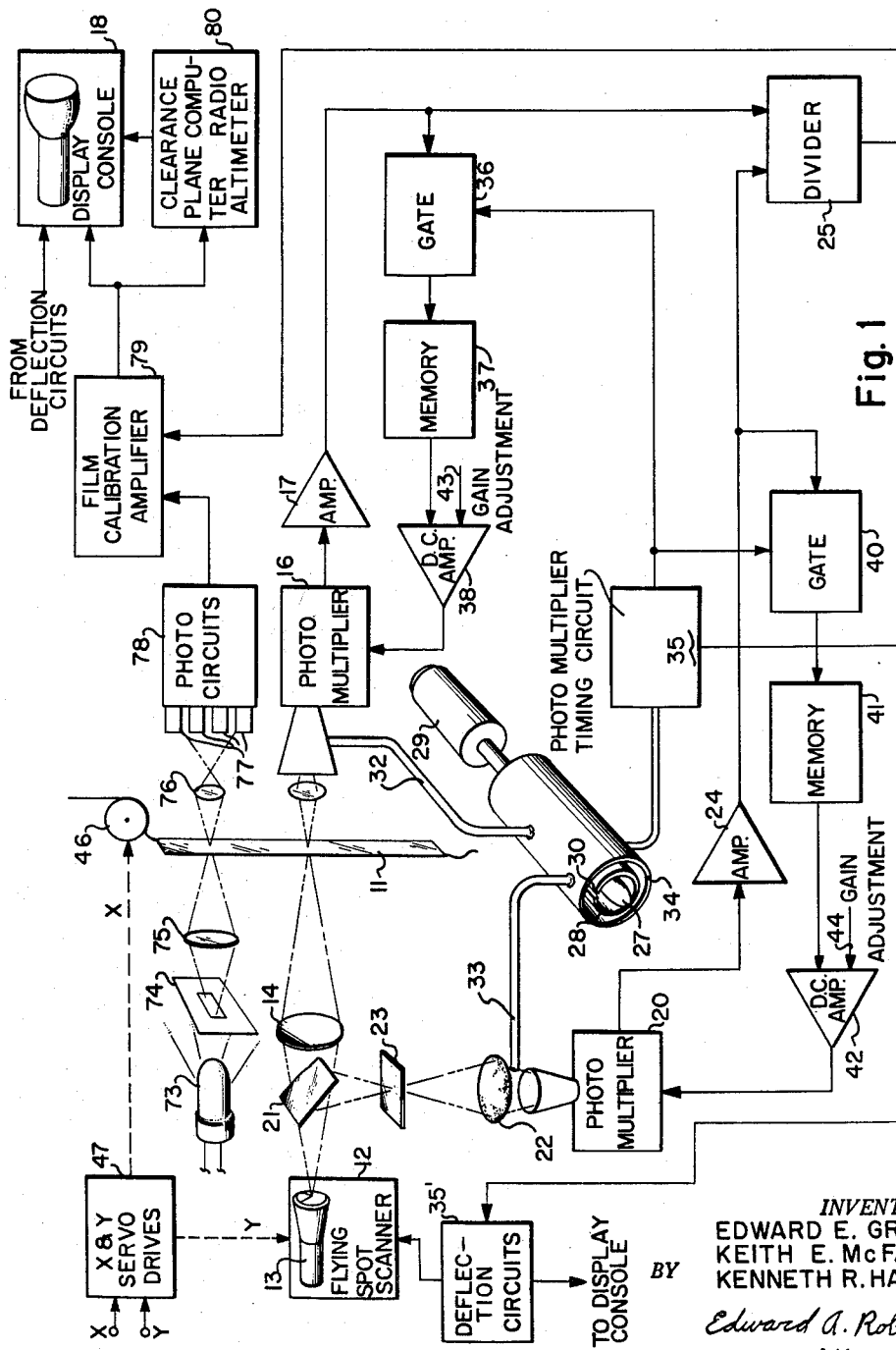

May 1, 1962

E. E. GRAY ETAL 3,031,774

RADAR SIMULATION

Filed July 8, 1960

2 Sheets-Sheet 1

INVENTORS
EDWARD E. GRAY
KEITH E. McFARLAND
KENNETH R. HACKETT

BY Edward A. Robinson
Attorney

INVENTORS.
EDWARD E. GRAY
KEITH E. McFARLAND
BY KENNETH R. HACKETT

Edward A. Robinson
Attorney

United States Patent Office 3,031,774
Patented May 1, 1962

3,031,774
RADAR SIMULATION
Edward E. Gray, Mountain View, Kenneth R. Hackett, Palo Alto, and Keith E. McFarland, San Mateo County, Calif., assignors to General Precision, Inc., Binghamton, N.Y., a corporation of Delaware
Filed July 8, 1960, Ser. No. 41,564
5 Claims. (Cl. 35—10.4)

This invention relates to apparatus for training personnel in the operation of aircraft radar equipment, and more specifically, this invention relates to apparatus for simulating a radar display of terrain as in a moving aircraft. This invention is related to a co-pending application for United States Letters Patent by Edward E. Gray, Thomas P. Pappas and Richard L. Taylor entitled "Terrain Radar Simulation," Serial No. 41,522, filed on July 8, 1960, disclosing apparatus for developing a video signal for radar simulation by scanning a photographically prepared surface.

Simulators for teaching and practicing aircraft navigation or the like are well-known and are widely used because of economy afforded in time and material and because of the elimination of hazards or airborne teaching. Aircraft flight simulators may comprise generally, a unit representing an airplane and having a seat(s) for the student(s) positioned relative to an instrument panel similar to the instruments which are used in actual aircraft. Training apparatus may include simulation of any equipment normally installed in an aircraft and may include a simulated radar display.

It is an object of this invention to provide radar simulation apparatus wherein photographically recorded information is scanned by means such as a flying spot scanner to generate a video signal for reproduction in a cathode ray tube; and more specifically, it is an object to provide means for correcting the video signal to compensate for variations in light intensity output of the flying spot scanner.

A further object of this invention is to provide a radar simulation system wherein a video signal is generated by a beam of light scanning a surface and picked up by a photo-sensitive device such as a photo-multiplier; and more specifically it is an object to provide means for periodically calibrating the photo multiplier to eliminate output variations which may be caused by inherent drift therein.

Another object of this invention is to provide an improved arrangement for calibrating the photo multiplier and for generation of timing pulses such that a standard illumination is impressed upon the photo multiplier during intervals when the display apparatus has been rendered inoperative.

Figure 2:
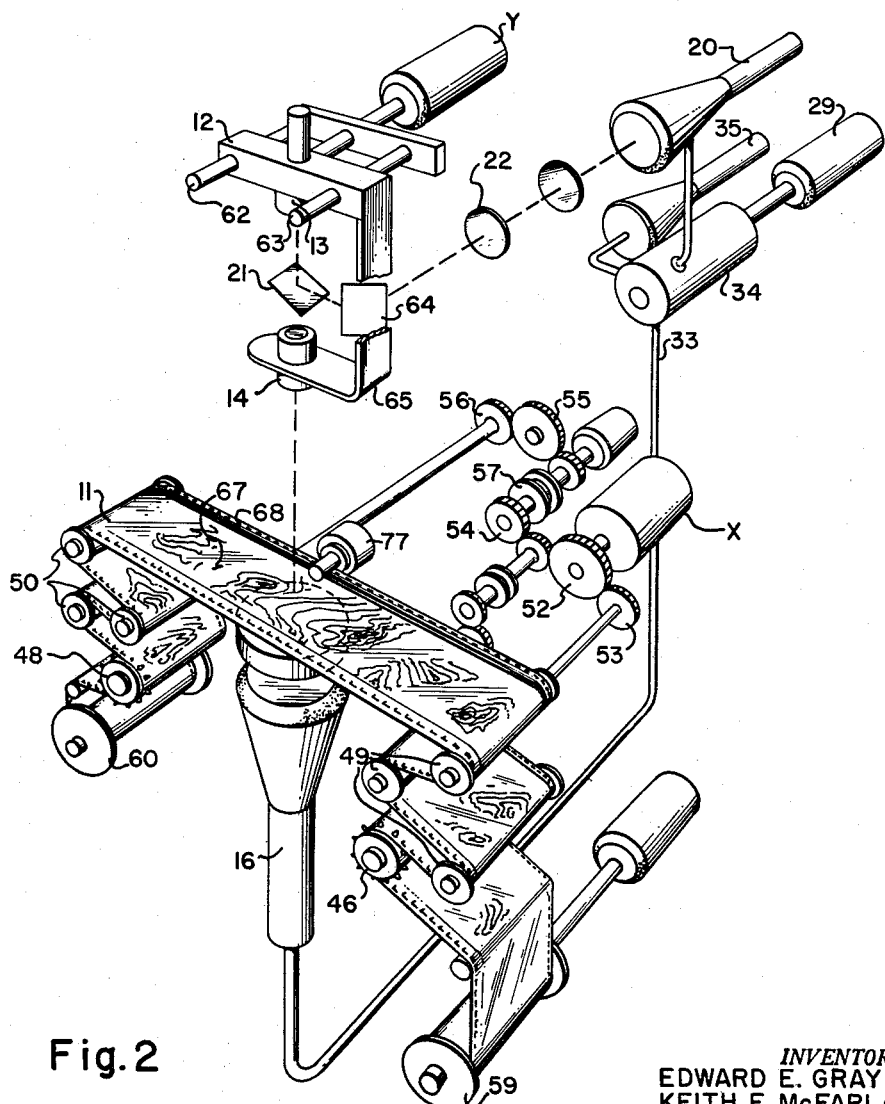

Numerous other objects and advantages will be apparent throughout the progress of the specification which follows. The accompanying drawings illustrate a certain selected embodiment of the invention and the views therein are as follows:

FIGURE 1 is a schematic diagram of the optical systems and electrical circuits of the apparatus of this invention; and FIGURE 2 is a diagram of film transport arrangement shown in perspective.

Briefly stated, according to this invention, a photographic surface or film strip 11 is scanned by means such as a flying spot scanner 12 having a cathode ray tube 13 for generating a spot of light which is focused upon the film strip 11 by optical means 14. The film strip includes a map section wherein various shades of gray represent contour elevations, and a photo-sensitive pick-up means such as a photo-multiplier 16 develops a video signal from the scanning of the film strip 11. The video signal is passed by an amplifier 17 and other circuits ultimately to a display console 18 including means such as a cathode ray tube for reproducing a simulated radar display. Means are provided for calibrating or correcting the video signal to compensate for (1) variations in the light output of the flying spot scanner 12, and (2) variations resulting from drift in the photo-multiplier 16.

The flying spot scanner 12 develops a spot of light on the face plate of the cathode ray tube 13 in a conventional manner by an electron beam impinging upon a phosphor layer. Because phosphors are granular, the layer is somewhat non-uniform, and therefore, the light emission is likewise non-uniform as the electron beam scans across the layer. The means provided for correcting or calibrating the video signal to compensate for the non-uniform light emission includes another photo-multiplier 20 optically arranged for directly sampling the light output of the flying spot scanner 12. The optical system associated with the photo-multiplier 20 may include a beam splitter or dichroic mirror 21, a lens 22 and means for attenuating the light such as a clear film panel 23. The output from the photo-multiplier 20 is passed by an amplifier 24 to an analog dividing circuit 25. The dividing circuit 25 receives the video signal from the elevation read-out channel including the amplifier 17 together with the signal from the photo-multiplier monitor 20, and performs an analog division such that the elevation video signal is attenuated by an amount corresponding to the instantaneous brightness of the flying spot scanner. The signal passed from the analog dividing circuit 25 corresponds to an elevation video signal which may have been developed directly had the flying spot scanner 12 produced a constant light output, and therefore, the circuitry including the photo-multiplier 20 and the divider 25 constitutes a means for compensating for variations in the illumination from the scanning means 12.

The photo-multipliers 16 and 20 are inherently subject to drift variations such that the electrical signal developed for a given light input tends to vary slowly or drift. A synchronized means for periodically correcting drift variation and re-calibrating the photo-multipliers is provided by a standard source of illumination 27 optically coupled to both the photo-multipliers 16 and 20. The illumination source may be a tube placed within a cylinder 28 which is mechanically coupled to and rotated by a synchronous motor 29. The cylinder 28 is generally opaque but has a longitudinal extending transparent slit or opening 30 therein. It may be appreciated that a flat beam or plane of light will be emitted and will sweep about the cylinder 28 as it rotates. A pair of light pipes or Lucite rods 32 and 33 connect with appropriate ports in an outer housing 34 surrounding the rotating cylinder 28 and constitute the means for passing light from the standard light source to the photo-multipliers 16 and 20. Obviously, the light passed to the photo-multipliers is synchronized with the rotation of the cylinder 28 and will appear upon the photo-multiplier circuits during retrace intervals when the flying spot scanner 12 and the display console 18 are blanked out and rendered inoperative.

The housing 34 contains a pair of ports for passing light to the photo-multipliers 16 and 20 and contains a port and further optical arrangement for passing light to a third photo-multiplier and timing circuit 35. The photo-multiplier circuit 35 receives pulses of light synchronized by the cylinder 28 and functions to generate electrical timing pulses for the remainder of the circuitry. Timing pulses from the circuit 35 are passed to deflection circuits 35' wherein deflection signals are generated for both the flying spot scanner 12 and the display console 18. Further timing pulses are passed to AND gates 36 and 40 whereby the gates are conditioned to pass signals during particular times with respect to the rotation of the cylinder 28 and the deflection signals. Therefore, the rotating cylinder 28 constitutes a master timing means for generating timed illumination pulses both for calibration of the photo-multipliers 16 and 20 and for generation of electrical timing pulses.

During re-trace intervals the standard illumination from the source 27 causes the photo-multipliers 16 and 20 to produce an output voltage for calibration purposes—which output voltage is passed by the respective amplifiers 17 and 24. During the re-trace intervals, the AND circuit or gate 36 is conditioned to pass the signal from the amplifier 17 to a feedback circuit including a memory device 37 and a direct current amplifier 38 to control a dynode voltage of the photo-multiplier 16. Since the voltage output from a photo-multiplier depends largely upon the acceleration voltages applied to dynodes or secondary emissive elements, a gain control may be provided for the photo-multiplier by control of the dynode voltages. Therefore, the signal level passed from the photo-multiplier 16 during re-trace intervals is fedback through a memory device 37 and an operational amplifier 38 to control the gain of the multiplier and to effectively establish the output voltage therefrom at a pre-set value. The memory device 37 may be a simple resistance- capacitance integrating circuit for storing a voltage from one re-trace interval to the next. During a re-trace interval, when the gate 36 is conditioned to conduct, the feedback circuits 36, 37 and 38 become operative to establish a desired output voltage from the photo-multiplier 16 whereupon an appropriate feedback voltage is stored in the memory circuit 37. Between re-trace intervals the gate 36 is rendered non-conductive, and the feedback voltage to control the dynodes of the photo-multiplier is merely retained in the memory 37. Thus, the photo-multiplier is calibrated during the re-trace times when both the flying spot scanner 12 and the display console 18 are blanked out and rendered inoperative.

The photo-multiplier 20 is likewise subject to drift variation, and therefore, a similar feedback circuit is provided to stabilize the output voltage therefrom. This feedback circuit includes the gate 40, a memory circuit 41 and an amplifier 42. In both feedback circuits the amplifiers 38 and 42 respectively include a manual gain adjustment 43 and 44 for establishing a desired output level.

As indicated heretofore, elevation contour information is processed on a film strip wherein various shades of gray represent various elevations. Since this apparatus simulates radar display as an airplane moves means are provided for moving the film 11 with respect to the flying spot scanner. The forward motion of the aircraft may be considered as an X direction and such movement may be accomplished by passing the film 11 over a drive roll 46 under the control of a servo drive generally shown as a block 47 (FIG. 1). Thus, the velocity of the drive roll 46 is controlled by an X servo mechanism from an X input and may be derived from simulating flight control of the training apparatus (not shown). Although the simulated flight path is longitudinal or in the X direction with respect to the film, such flight path may deviate from the ideal center line of the film whereupon a Y drive component may be introduced. The Y drive or transverse movement is accomplished by physically moving the flying spot scanner 12 and its associated optical system 14 transversely with respect to the film 11.

As shown in FIGURE 2, the film 11 is trained about a pair of sprocket drive rolls 46 and 48 together with idler rolls 49 and 50 on each side of the photo-multiplier 16. A first drive motor X accomplishes movement of the film through a pair of gears 52 and 53 which drivingly coupled the motor X to the sprocket roll 46. Reversal of the film may be accomplished since the motor X is also coupled to the drive sprocket 48 via the gears 52, 54, 55 and 56. A safety clutch 57 may be included in the drive arrangement. A pair of reels 59 and 60 will feed film to and take up film from the respective drive sprockets 46 and 48.

A linear motor Y is directly connected to move the flying spot scanner carriage 12 along a pair of ways 62 and 63. The beam splitting dichoric mirror 21 and the lens 22 together with another mirror 64 are supported by a bracket 65 fixed to the flying spot scanner carriage 12.

The film 11 includes a principle area 67 representing a map with contour lines appearing thereon. A further area 68 is a strip along one side of the film having standard contours extending longitudinally of the film. The area 68 constitutes a gray scale band and contains standard contours extending longitudinally of the film.

The map portion of the film may be prepared by a successive stripping technique. This technique is fully described in a bulletin entitled "Dystrip Technique of Color Separation" by the Aeronautical Chart and Information Center, Air Photographic and Charting Service (MATS). Generally this technique involves photographing contour lines from a map onto a negative and then hand stripping the emulsion from the film in particular areas representative of elevations. The stripping process is alternated with an exposure of the final film strip through the "windows" or specific openings of the stripped away material from the negative and then to darken a positive film overlying the negative. After each successive exposure of the diapositive transparency, a further contour elevation area may be stripped from the negative. The areas of highest elevation will be first stripped from the negative and first exposed upon the positive film. Successive exposures of the positive will include successively lower elevations together with the higher elevations which have been previously exposed. Therefore, the diapositive film map area will be longer exposed and darker in those regions of high elevation while the regions of low elevations will be lighter in character. The mountain tops will be black and the low valleys will be white with various shades of gray representing elevations therebetween.

Since photographic film processing techniques are subject to density variations, the radar simulation apparatus provides a means for electronic compensation of the signals picked up from the film strip. The gray scale band area 68 is photographically processed together with and identical to, the map area 67. The darker portion of the gray scale band corresponds with the highest elevations or mountain peaks of the map area and the contour gradation extends across the gray scale band such that the whiter portion thereof corresponds to the lowest elevations of the map. It would be possible to determine the elevation of any point on the map by a comparison with the grayness value of that point to the gray scale representing standard elevations, since the photographic processing was the same in both cases and any grayness error resulting from the processing would appear both on the map and on the gray scale. Although the map elevations may be obtained by direct comparison with the gray scale, it is contemplated that the film be digitally calibrated according to its grayness characteristic and that a film calibration amplifier 79 be provided to electronically correct for variations in the film due to photographic processing.

The digital calibration of the photographic film, and the structure and operation of the film calibration amplifier 79 is the subject of the co-pending patent application of Edward E. Gray, Thomas P. Pappas, and Richard L. Taylor, Serial No. 41,522 filed on July 8, 1960. According to this copending patent application, an area or band extending along the one side of the film strip 11 includes four tracks for digital indicia. The indicia constitute a four-bit coded representation corresponding to a grayness characteristic of the film, which is generally non-linear and results from many variables of photography and associated with the film processing. Further incorporated into this characteristic may be the pick-up response characteristic of the photo-multiplier 16, and the output response characteristic of the display console 18.

In FIGURE 1 the digital tracks of the film 11 are illuminated by a narrow beam of light which is generated by a source 73 and shaped by a slit aperture 74 and then focused upon the track by optical means 75. Further optical means 76 may focus incremental areas from the four digital tracks of the film strip 11 upon four photo-sensitive devices 77. The photo-sensitive devices 77 may be of conventional nature, and it has been contemplated to use photo transistors in this circuit. The photo cells or photo transistors 77 will produce digital electrical signals which may be amplified by photo circuits 78 and passed to the film calibration circuit 79. The film calibration circut 79 may include an amplifying means for passing the video signal from the divider 25 to the display console 18 and to a clearance plane computer and radio altimeter 80.

It may be appreciated that the radar display simulation apparatus continually corrects for variation in the film density or grayness, for variation in the brightness of the flying spot scanner 12, and for variation or drift in the photo-multiplier circuits. Since the drift variation of the photo-multipliers is comparatively slow as compared with the scanning rate, the feedback circuit including the memory 37 and the amplifier 38 may pass only low frequencies and direct currents. However, the analog dividing circuit 25 must be extremely fast in operation since the light intensity of the flying spot scanner 12 may vary at a 500 kilocycle rate. This circuit is contemplated to be similar to a logarithm multiplier shown and described on page 59 of "Analog Methods Computation and Simulation" by W. J. Karplus and W. W. Soroka published by McGraw-Hill Book Company, 1959. This circuit converts both inputs into logarithmic form, performs an analog subtraction, and then converts the output to the antilogarithm. Fast operation of this circuit is obtained by using only a single stage amplifier with a large feedback current. Since the amplification is accomplished in a single stage, the resulting phase shift and "roll-off" characteristics of the amplifier are minimized, and the response time is greatly reduced. The amplifier 79, for providing a film density, or H and D correction must likewise be of fast operation for passing signals and for providing diode step corrections in the video signal.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for simulating a radar display of terrain, said apparatus comprising a photographic film whereon contours are represented as shades of gray, a means for scanning the film with a beam of light, a first photo-sensitive means positioned to receive the scanning beam before impingment upon the film, a second photo-sensitive means positioned to receive the scanning beam after impingement upon the film, said second photo-sensitive means being operable to generate an electrical signal corresponding to the shade of gray being scanned, analog means electrically coupled to the second photo-sensitive means for receiving and passing the signal, said first photo-sensitive means being coupled to the analog means and being operable to modify the electrical signal in according with the intensity of the light beam from the scanning means, and timing means optically coupled to both photo-sensitive means for periodically passing a standard illumination and calibrating both said photo-sensitive means.

2. Apparatus for simulating a radar display of terrain, said apparatus comprising a photographic film whereon contours are represented as shades of gray, a flying spot scanning means for generating a beam of light, a first photo-sensitive means operable to generate a beam calibration signal, optical means associated with the flying spot scanning means for focusing the beam of light upon the film and upon the first photo-sensitive means, a second photo-sensitive means positioned to receive the light beam after impingement upon the film and operable to generate an output signal corresponding to the shades of gray which are scanned, a divider circuit electrically coupled to both the first and the second photo-sensitive means and operable to divide the output signal by the beam calibration signal from the first photo-sensitive means, and a timing and calibration means optically coupled to both photo-sensitive means for passing a standard illumination thereto at periodic intervals.

3. Apparatus for simulating a radar display of terrain, said apparatus comprising a photographic film whereon terrain contours are represented as shades of gray, a means for scanning the film with a beam of light, a first photo-multiplier optically associated with the scanning means and with the film and operable to generate an electrical signal corresponding with the shades of gray of the film, a second photo-multiplier optically coupled to the scanning means for sensing the intensity thereof, analog means coupled to both photo-multipliers and operable to modify the electrical signal in accordance with the intensity of the scanning means, an auxiliary light source optically coupled to both photo-multipliers, and a timing means associated with the auxiliary light source and coupled to the scanning means, said timing means being operable to blank the scanning means and to disable the amplifying means at the end of each scan, said timing means being further operable to pass a standard illumination from the auxiliary light source to both photo-multipliers during the times when the scanning means is blanked.

4. The apparatus in accordance with claim 3 wherein the timing means comprises a rotatable cylinder having an aperture therein, an optical means positioned adjacent to the cylinder for passing light to the photo-multipliers when the cylinder assumes a first rotary position, and another photo-multiplier optically coupled to receive light from the aperture when the cylinder is in a second rotary position and operable to generate timing signals synchronized with the rotation of the cylinder.

5. Apparatus for simulating a radar display of terrain, said apparatus comprising a photographic film whereon terrain contours are represented as shades of gray, a flying spot scanning means for generating a scanning beam of light, a first photo-multiplier for developing a beam calibration voltage, an optical system associated with the scanning means for focusing the beam on the film and on the first photo-multiplier, a second photo-multiplier positioned in spaced relation with the film for receiving the scanning beam therethrough and operable to generate a video signal corresponding to the shades of gray of the film, a rotatable cylinder having an aperture therein, an auxiliary light source positioned within the cylinder, another optical means coupling both photo-multipliers to the auxiliary light source at times when the cylinder is in a first rotary position, a third photo-multiplier optically coupled to the cylinder and operable to generate timing pulses in accordance with the rotation of the aperture, deflection means coupled to receive timing pulses from the third photo-multiplier and coupled to pass deflection signals to the scanning means whereby the scanning beam is synchronized with the rotating cylinder, said auxiliary light source within the cylinder being operable to calibrate the first and second photo-multipliers in synchronism with the scanning beam during retrace intervals thereof.

References Cited in the file of this patent

UNITED STATES PATENTS

| | | |
|---|---|---|
| 2,406,751 | Emerson | Sept. 3, 1946 |
| 2,737,730 | Spencer | Mar. 13, 1956 |
| 2,788,588 | Lindley | Apr. 16, 1957 |
| 2,932,093 | Lang | Apr. 12, 1960 |